US012782148B2

(12) United States Patent
Shirozono et al.

(10) Patent No.: US 12,782,148 B2
(45) Date of Patent: Nov. 3, 2026

(54) ROUTE GENERATION DEVICE, PARKING ASSISTANCE SYSTEM, AND ROUTE GENERATION METHOD

(71) Applicant: Mitsubishi Electric Corporation, Tokyo (JP)

(72) Inventors: Masataka Shirozono, Tokyo (JP); Takashi Matsumoto, Tokyo (JP); Kenta Katsu, Tokyo (JP); Kazuhiro Tokuyama, Tokyo (JP); Chiharu Matsumura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 150 days.

(21) Appl. No.: 18/588,018

(22) Filed: Feb. 27, 2024

(65) Prior Publication Data

US 2024/0302175 A1 Sep. 12, 2024

(30) Foreign Application Priority Data

Mar. 8, 2023 (JP) ................................ 2023-035398

(51) Int. Cl.
*G01C 21/34* (2006.01)
*B60W 30/06* (2006.01)

(52) U.S. Cl.
CPC ......... *G01C 21/3446* (2013.01); *B60W 30/06* (2013.01)

(58) Field of Classification Search
CPC .......................... B60W 30/06; G01C 21/3446
See application file for complete search history.

(56) References Cited

U.S. PATENT DOCUMENTS

| | | | | |
|---|---|---|---|---|
| 9,969,386 B1 | 5/2018 | Wang et al. | | |
| 2010/0076640 A1* | 3/2010 | Maekawa | ............ | G05D 1/0217 701/25 |

FOREIGN PATENT DOCUMENTS

| | | | | |
|---|---|---|---|---|
| CN | 111897341 A * | 11/2020 | ........... | G05D 1/0217 |
| JP | 6749480 B2 | 9/2020 | | |

* cited by examiner

*Primary Examiner* — Jerrod Irvin Davis
(74) *Attorney, Agent, or Firm* — XSENSUS LLP

(57) ABSTRACT

Provided is a route generation device that enables reduction in a processing load for generating a parking route. A route generation device of the present disclosure includes: a surrounding environment information acquisition unit which acquires surrounding environment information around an own vehicle; an own-vehicle position estimation unit which estimates an own-vehicle position; a geometric route generation unit which generates a geometric route, using an expression representing a geometric shape of a route; a graph search route generation unit which generates a graph search route, using a graph search algorithm for searching for a route using a plurality of nodes and a plurality of edges connecting the nodes; and a route combination unit which generates a parking route from a parking start position to a parking goal position by combining the geometric route and the graph search route.

15 Claims, 12 Drawing Sheets

ROUTE GENERATION DEVICE, PARKING ASSISTANCE SYSTEM, AND ROUTE GENERATION METHOD

CROSS-REFERENCE TO RELATED APPLICATION

This application is based upon and claims the benefit of priority from Japanese Patent Application No. 2023-035398, filed Mar. 8, 2023, the entire contents of which are incorporated herein by reference.

BACKGROUND

The present disclosure relates to a route generation device, a parking assistance system, and a route generation method.

Along with development of automated driving technology for a vehicle, various parking assistance devices and parking assistance systems for assisting parking of a vehicle are being proposed or put into practice. For example, a parking assistance system described in Patent Document 1 performs route generation for a target route from an initial position to a goal position by a graph search algorithm using a graph theory, thus parking a vehicle.

Patent Document 1: Japanese Patent No. 6749480

However, in the parking assistance system described in Patent Document 1, in a situation in which parking is performed by repeating a turnabout with a short traveling distance in a parking space as in parallel parking, redundant calculations are increased, thus causing a problem that the processing load increases.

SUMMARY

The present disclosure has been made to solve the above problem and an object of the present disclosure is to provide a route generation device, a parking assistance system, and a route generation method that enable reduction in a processing load for generating a parking route.

A route generation device according to the present disclosure includes a surrounding environment information acquisition unit which acquires information about a surrounding environment around an own vehicle; an own-vehicle position estimation unit which estimates an own-vehicle position; a geometric route generation unit which generates a geometric route, using an expression representing a geometric shape of a route; a graph search route generation unit which generates a graph search route, using a graph search algorithm for searching for a route using a plurality of nodes and a plurality of edges connecting the nodes; and a route combination unit which generates a parking route from a parking start position to a parking goal position in a parking space by combining the geometric route and the graph search route.

A parking assistance system according to the present disclosure includes the above route generation device; and a vehicle control device which parks the own vehicle on the basis of the parking route generated by the route generation device.

A route generation method according to the present disclosure is a route generation method which is a vehicle control method for executing the following steps by a processing circuit, the route generation method including the steps of: generating, using an expression representing a geometric shape of a route, a geometric route, and generating a terminal portion of the geometric route as a connection point; generating a graph search route on the basis of a graph search algorithm using nodes and an edge connecting the nodes; and generating a parking route from a parking start position to a parking goal position by combining the geometric route and the graph search route via the connection point.

With the route generation device, the parking assistance system, and the route generation method according to the present disclosure, a route from the parking start position to the connection point is generated by a graph search algorithm, and a route from the connection point to the parking goal position is generated as a geometric route, thus providing an effect of enabling reduction in the processing load for generating a parking route.

DETAILED DESCRIPTION OF THE EMBODIMENTS

First Embodiment

<Configuration of Route Generation Device According to First Embodiment>

Figure 1:
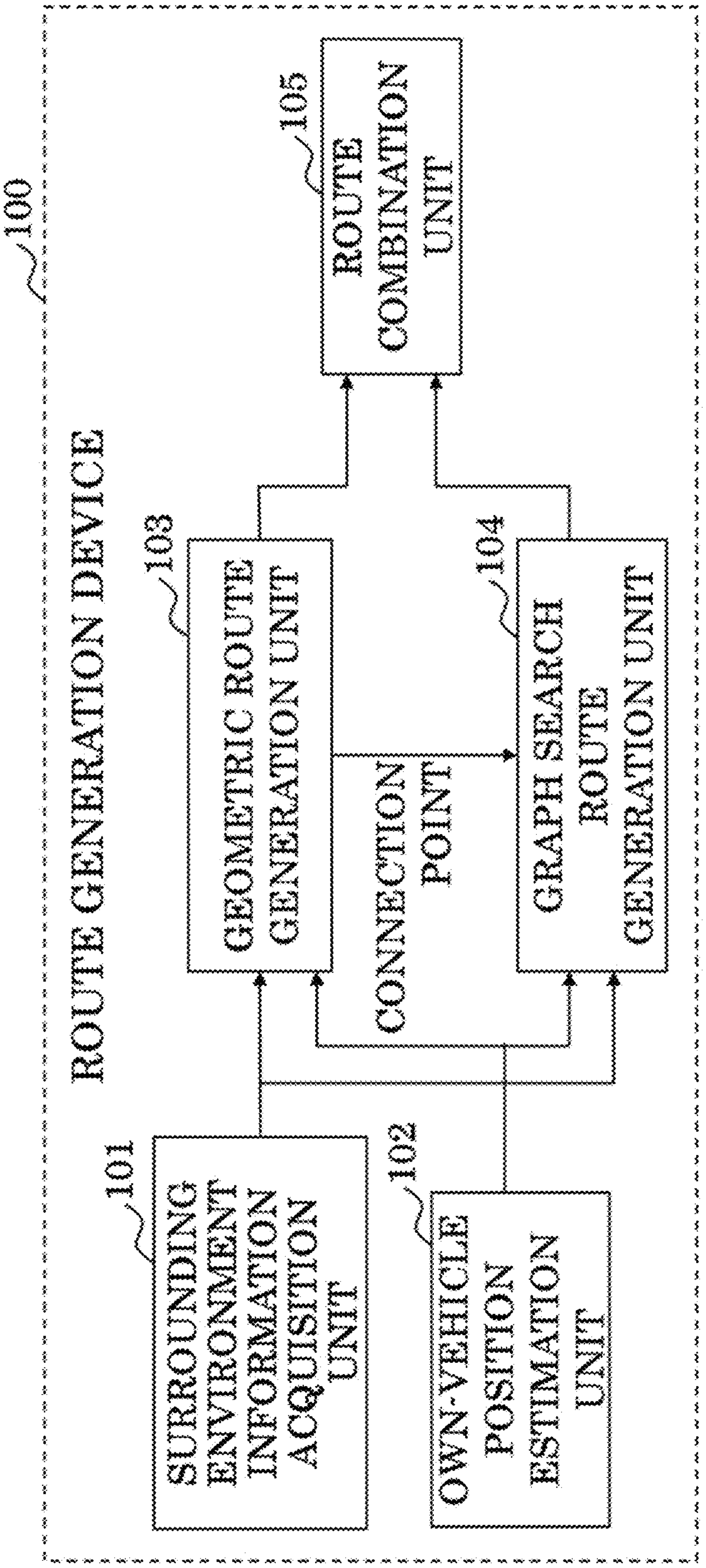
FIG. 1 is a block diagram of a route generation device according to the first embodiment of the present disclosure.

FIG. 1 is a block diagram of a route generation device 100 according to the first embodiment of the present disclosure. The route generation device 100 is mounted to a vehicle, for example.

The route generation device 100 includes a surrounding environment information acquisition unit 101, an own-vehicle position estimation unit 102, a geometric route generation unit 103, a graph search route generation unit 104, and a route combination unit 105. Each component of the route generation device 100 will be described below.

<Surrounding Environment Information Acquisition Unit>

The surrounding environment information acquisition unit 101 acquires surrounding environment information around an own vehicle 10, from various sensors provided to the own vehicle 10 or outside of the own vehicle 10 such as a traffic control center. The surrounding environment information acquisition unit 101 outputs the acquired surrounding environment information to the geometric route generation unit 103 and the graph search route generation unit 104.

The surrounding environment information is a set of information used for generating a route, such as a parking space 30, obstacle information about an obstacle 40 around the own vehicle 10 including a passage width, and a parking goal position EP. Examples of a method for acquiring the surrounding environment information include a method of detecting the obstacle 40 by measuring a distance between the own vehicle 10 and the obstacle 40 using a sonar sensor, a method of detecting the obstacle 40 around the own vehicle 10 by an image sensor such as a camera or a high-accuracy sensor such as a light detection and ranging (LiDAR) sensor which is a kind of radar sensor, and a method of acquiring the information through communication with outside of the own vehicle 10, such as a traffic control center. In addition, the surrounding environment information may be acquired from one or a combination of two or more of vehicle-to-vehicle communication devices and road-to-vehicle communication devices.

<Own-Vehicle Position Estimation Unit>

The own-vehicle position estimation unit 102 estimates the present own-vehicle position. The own-vehicle position estimation unit 102 outputs the estimated own-vehicle position to the geometric route generation unit 103 and the graph search route generation unit 104. Means for estimating the own-vehicle position by the own-vehicle position estimation unit 102 is, for example, a GNSS receiver which acquires information on an absolute position (latitude and longitude) by receiving a signal transmitted from a global navigation satellite system (GNSS) such as a global positioning system (GPS). The own-vehicle position may be detected by a speed sensor, an orientation sensor, or the like.

<Geometric Route Generation Unit>

The geometric route generation unit 103 generates a route using geometric formulation, i.e., a combination of curves. Curves are formulated by expressions representing geometric shapes. The route generated by the geometric route generation unit 103 is referred to as a geometric route AL in the following description. On the basis of a parking goal position EP and the surrounding environment information around the own vehicle, the geometric route generation unit 103 generates a route from the parking goal position EP to a position in the parking space 30 or in the vicinity of the parking space 30, i.e., the geometric route AL.

In generating a route, the geometric route generation unit 103 provisionally sets a terminal goal point at a position where the vehicle can go out, in the parking space 30 or in the vicinity of the parking space 30, and generates a geometric route AL from the parking goal position EP to the terminal goal point by combining curves. A terminal portion in the parking space 30 or in the vicinity of the parking space 30 on the geometric route AL generated as described above does not exactly coincide with the terminal goal point. Along with generation of the geometric route AL, a connection point CP which is a terminal portion in the parking space 30 or in the vicinity of the parking space 30 on the geometric route AL, is generated.

The terminal goal point may be set at a point where it is assumed that the vehicle can go out, with reference to the vehicle width or the vehicle length of the own vehicle 10 from the boundary of the parking space 30 against the road side, for example. In a case of parallel parking, as an example, with the vehicle width of the own vehicle 10 denoted by LW, the terminal goal point may be set in a range of 0.2 LW to 0.5 LW toward the inner side of the parking space 30 from the center of a boundary line between the parking space 30 and a passage, with reference to the vehicle width LW. In a case of perpendicular parking, as an example, with the vehicle length of the own vehicle 10 denoted by LL, the terminal goal point may be set in a range of 0.5 LL to 1.5 LL toward the passage side from the center of a boundary line between the parking space 30 and the passage, with reference to the vehicle length LL. A provisional geometric route AL from the parking start position SP to the parking goal position EP may be generated, and a point in the parking space 30 or in the vicinity of the parking space 30 on the provisional geometric route AL may be set as the terminal goal point.

The geometric route AL is formed by a combination of arbitrary curves. Here, examples of curves include a straight line, a clothoid curve, an arc curve, and a polynomial curve. For example, using a route generation method as disclosed in WO2020-217315, the geometric route AL composed of a movement distance S and a curvature p can be generated. As another example of a method for generating the geometric route AL, a known method such as a state lattice method, a potential method, or a spline interpolation function method may be used.

An evaluation function is applied to the route generated by the geometric route generation unit 103, to generate an evaluation function minimizing route that minimizes an evaluation function J. The evaluation function J can be represented by the following Expression (1) using a weight coefficient ω.

$$J = \sum_{i \in M} \omega_{\rho,i}(s) |\rho_i(s)|^k \tag{1}$$

In Expression (1), i is an index for each turnabout, k is a positive number, and M is the number of turnabouts through the entire generated geometric route. That is, a route represented by the curvature ρ and a variable s of the movement distance S when the evaluation function J of Expression (1) is minimized is outputted as the evaluation function minimizing route. The evaluation function minimizing route is the geometric route AL outputted from the geometric route generation unit 103.

In Expression (1), a weight coefficient $\omega_{\rho,i}(s)$ is a value representing the weight coefficient ω for each turnabout at the i-th time by the variable s of the movement distance S. Regarding the weight coefficient $\omega_{\rho,i}(s)$, a function with respect to the variable s of the movement distance S can be set for each turnabout, like $\omega_{\rho,i}(s)$, $\omega_{\rho,2}(s)$, and $\omega_{\rho,3}(S)$.

Examples of means for minimizing the evaluation function J include sequential quadratic programming and interior point method. Alternatively, automatic control and dynamic optimization (ACADO) or continuation/generalized minimum residual (C/GMRES) may be used. That is, for minimizing the evaluation function J, a known method such as the above methods may be applied.

The geometric route generation unit 103 outputs the geometric route AL which is the evaluation function minimizing route and information about whether or not generation of the geometric route AL is possible, to the route combination unit 105. In addition, the geometric route generation unit 103 outputs the information about whether or not the generation is possible, and a final position of the evaluation function minimizing route, to the graph search route generation unit 104. Here, the final position of the evaluation function minimizing route is referred to as the connection point CP. In addition, the information about whether or not generation of the geometric route AL is possible is information about whether or not the geometric route AL can be generated by the geometric route generation unit 103. This is because there is a case where the geometric route generation unit 103 cannot generate the geometric route AL, depending on the content of the surrounding environment information around the own vehicle and the parking goal position EP.

<Graph Search Route Generation Unit>

The graph search route generation unit 104 generates a route, i.e., a graph search route GL, using a graph search algorithm. The graph search route generation unit 104 generates the graph search route GL, using a graph search algorithm based on a graph theory, such as an A* (A-star) search algorithm. As the graph search algorithm, for example, a graph search algorithm described in Patent Document 1 may be applied.

The graph search algorithm described in Patent Document 1 is a route search method configured by nodes (points or vertices) and edges (links or lines) connecting the nodes, to calculate such a shortest route that inter-node cost (evaluation index) between two nodes connected by an edge, e.g., the total cost represented by a movement distance, is minimized. As the graph search algorithm used in the route generation device and the route generation method according to the first embodiment, application of the graph search algorithm described in Patent Document 1 has been shown as an example, but another known graph search algorithm may be applied.

<Route Combination Unit>

The route combination unit 105 combines the geometric route AL generated by the geometric route generation unit 103 and the graph search route GL generated by the graph search route generation unit 104, and outputs a parking route from the parking start position SP to the parking goal position EP.

The components of the route generation device 100 according to the first embodiment are as described above.

Example 1 of First Embodiment

<Route Generation Device in Example 1>

Hereinafter, the route generation device 100 in example 1 will be described. It is noted that an application example of the route generation device 100 is not limited to application examples in the following examples 1 to 3.

FIG. 2, FIG. 3, FIG. 4, and FIG. 5 are schematic diagrams illustrating operation of the route generation device 100 in example 1. Operation of the route generation device 100 in example 1 will be described below with reference to FIG. 2, FIG. 3, FIG. 4, and FIG. 5.

Figure 2:
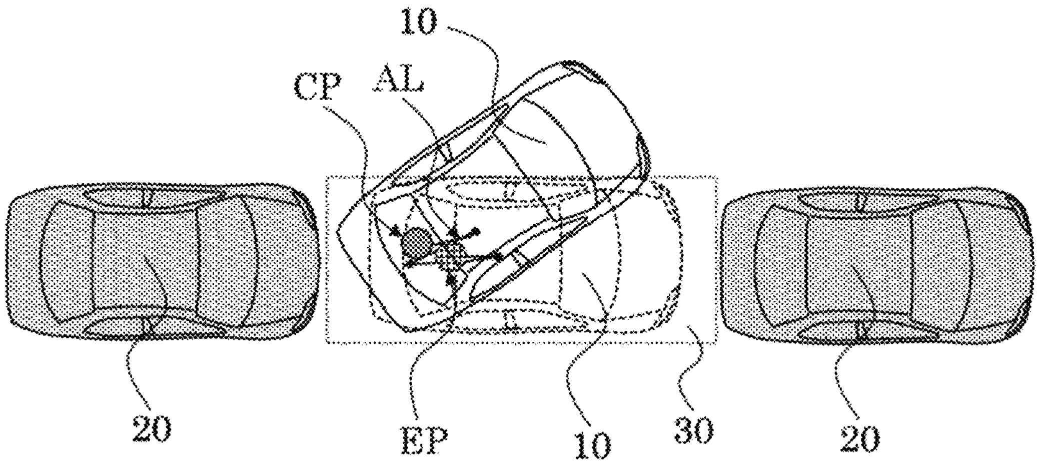
FIG. 2 is a schematic diagram illustrating operation of the route generation device in example 1 of the first embodiment.
Figure 3:
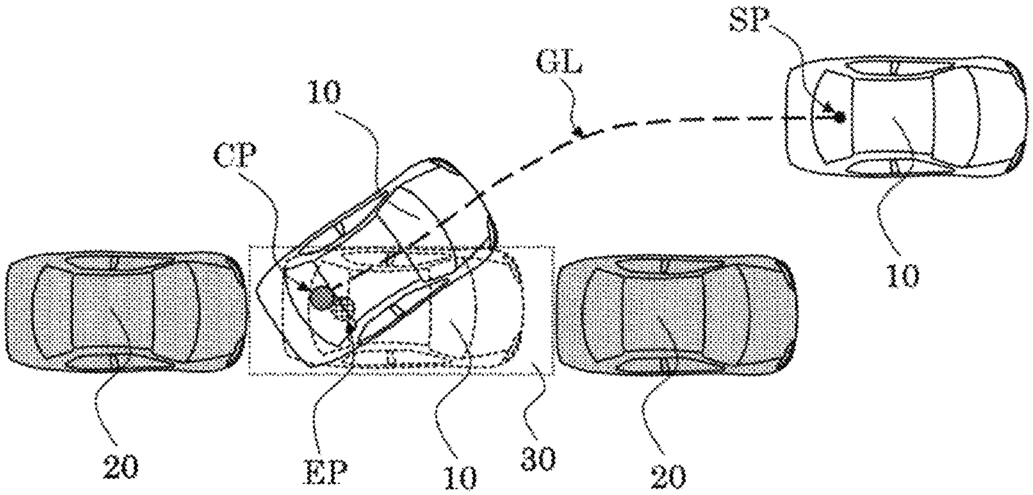
FIG. 3 is a schematic diagram illustrating operation of the route generation device in example 1 of the first embodiment.

The parking route outputted from the route combination unit 105 is a route obtained by combining the geometric route AL from the parking goal position EP to the connection point CP in the parking space 30 or in the vicinity of the parking space 30 generated by the geometric route generation unit 103 as shown in FIG. 2 and the graph search route GL from the parking start position SP to the connection point CP generated by the graph search route generation unit 104 as shown in FIG. 3. In FIG. 2, the parking space 30 is a space present between two adjacent vehicles 20.

Figure 4:
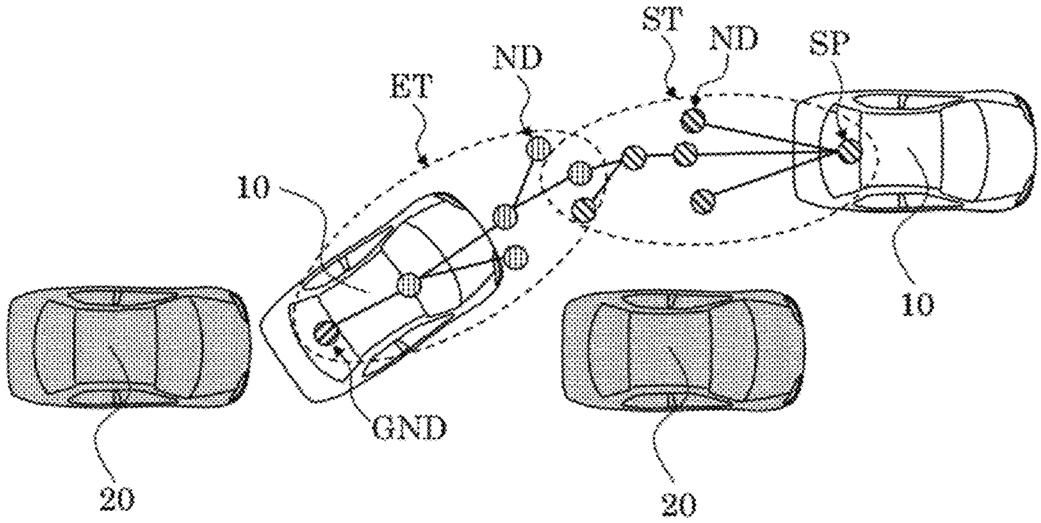
FIG. 4 is a schematic diagram illustrating operation of the route generation device in example 1 of the first embodiment.

In generating the graph search route GL, as shown in FIG. 4, the graph search route generation unit 104 uses such a graph search algorithm configured to generate the graph search route GL by connecting an initial tree ST composed of a plurality of nodes and a plurality of edges for heading toward a goal node GND corresponding to the connection point CP or the parking goal position EP of the own vehicle 10 starting from an initial node corresponding to an initial position of the own vehicle 10, i.e., the parking start position SP, and a goal tree ET composed of a plurality of nodes and a plurality of edges for heading toward the initial node starting from the goal node. As described above, as the graph search algorithm, the one described in Patent Document 1 may be used, for example.

Figure 5:
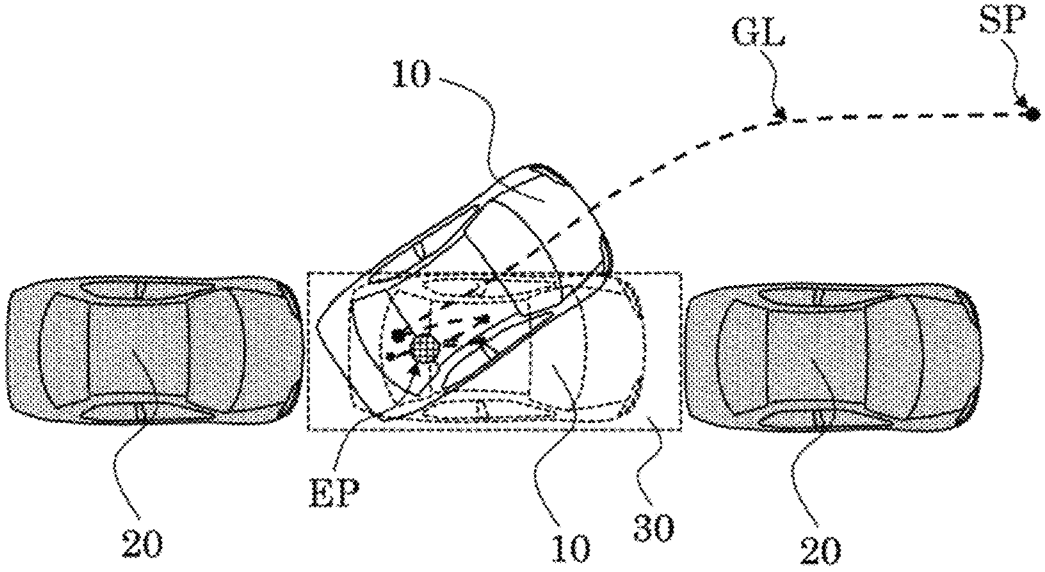
FIG. 5 is a schematic diagram illustrating operation of the route generation device in example 1 of the first embodiment.

As shown in FIG. 5, in a case where the geometric route generation unit 103 cannot generate the geometric route AL, the graph search route generation unit 104 may generate a route from the parking start position SP to the parking goal position EP, i.e., the entire parking route.

In a case where the graph search route generation unit 104 cannot find a route from the parking start position SP to the connection point CP, i.e., the graph search route GL, without limitation to the above method, the graph search route generation unit 104 may search for the graph search route GL again, i.e., generate the graph search route GL again, by changing a parameter to be used in the graph search algorithm, for example. In a case of changing a parameter, examples of parameters to be used in the graph search algorithm include the length of an edge connecting nodes, the curvature of the edge, and the maximum number of times of iteration. A plurality of parameters may be used. A parameter to be changed may be other than the above parameters as long as the parameter can be used in the graph search algorithm, and is not particularly limited to the above parameters.

The basic operation of the route generation device 100 in example 1 is as described above. Hereinafter, operation of the route generation device 100 in example 1 will be described in more detail.

<Route Generation Method Using Route Generation Device in Example 1>

Figure 6:
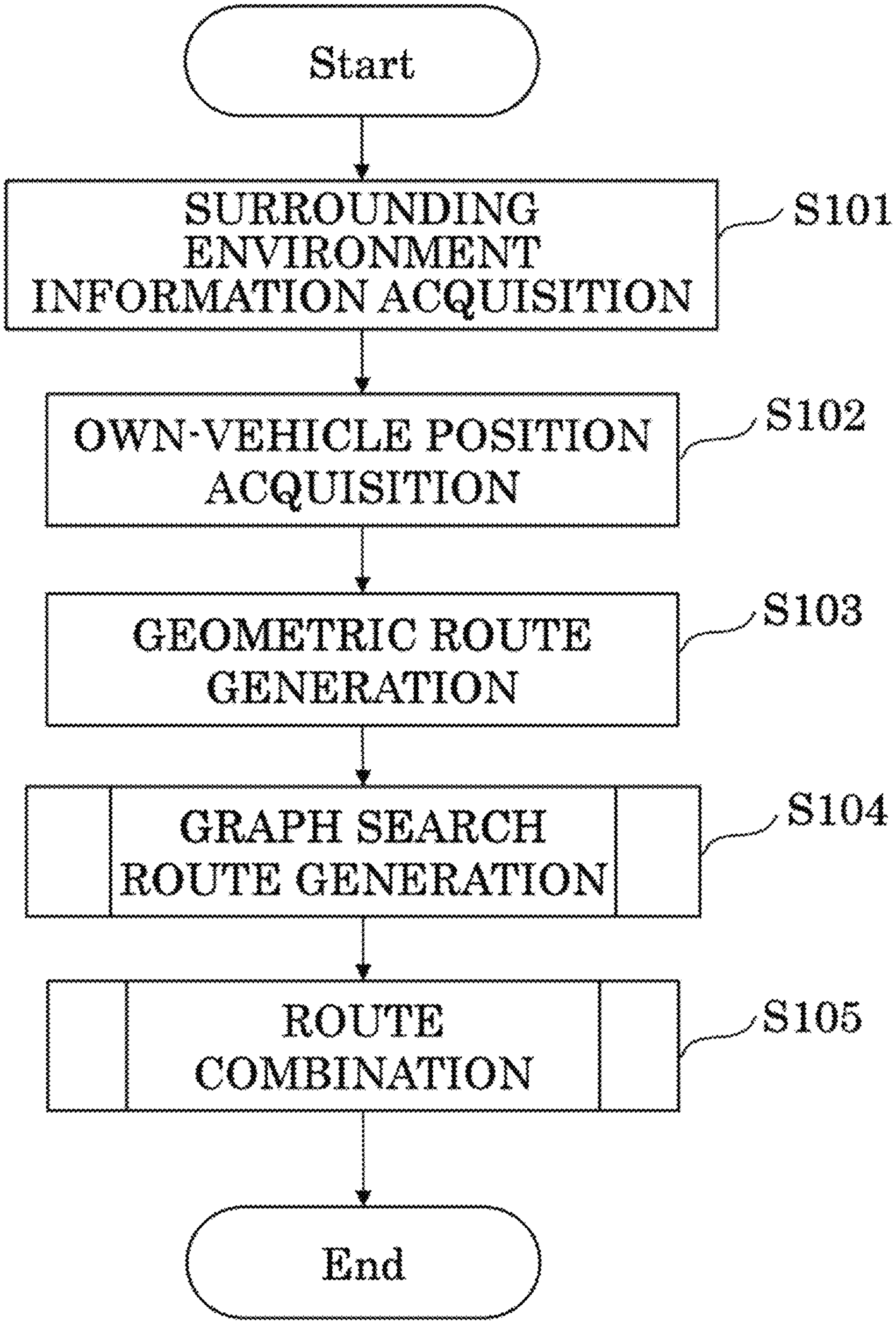
FIG. 6 is a flowchart illustrating a processing flow of the route generation device in example 1 of the first embodiment.
Figure 7:
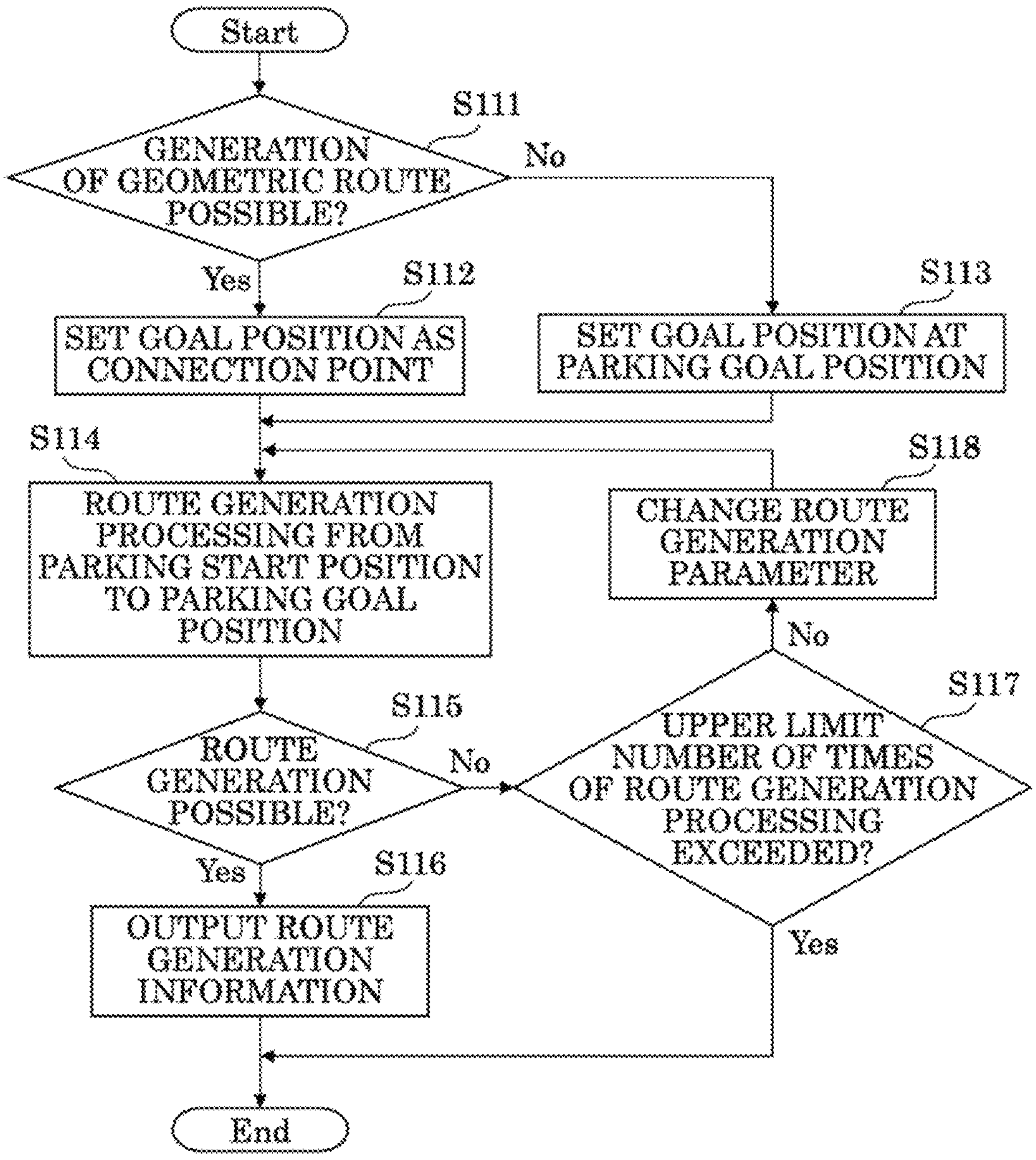
FIG. 7 is a flowchart illustrating a processing flow of a graph search route generation unit of the route generation device in example 1 of the first embodiment.
Figure 8:
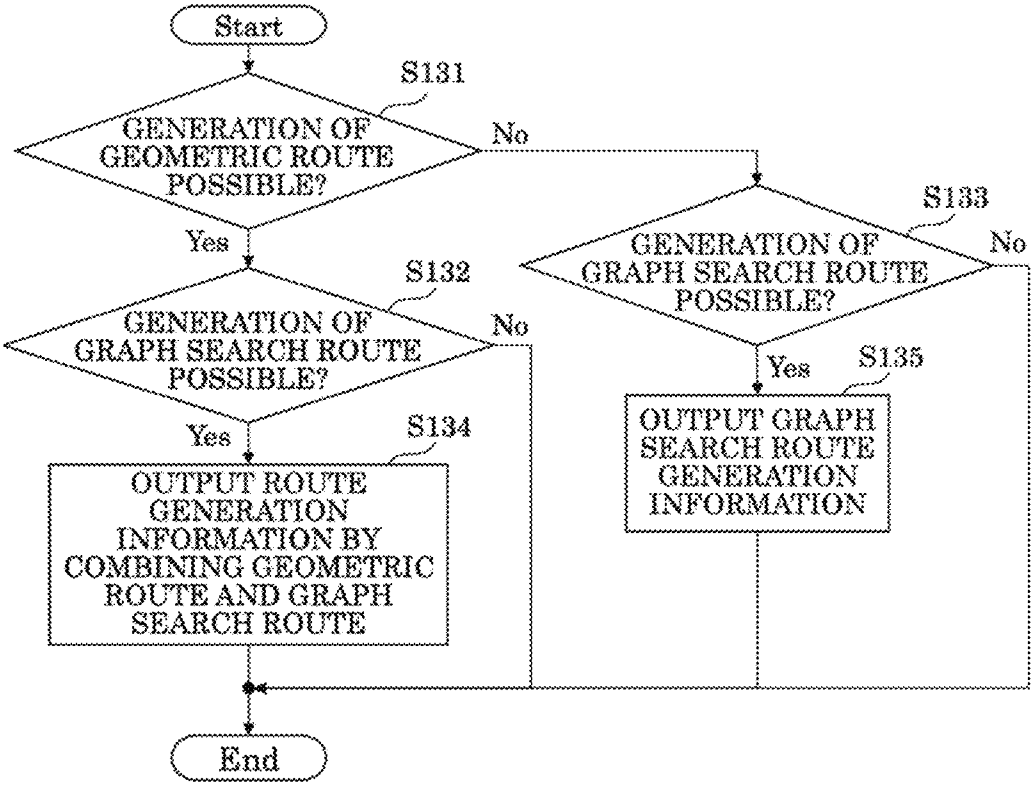
FIG. 8 is a flowchart illustrating a processing flow of a route combination unit of the route generation device in example 1 of the first embodiment.

Hereinafter, a processing flow, i.e., a route generation method by the route generation device 100 in example 1 will be described with reference to flowcharts in FIG. 6, FIG. 7, and FIG. 8. In the following description, the flowchart shown in FIG. 6 is used for steps S101 to S105, the flowchart shown in FIG. 7 is used for steps S111 to S117, and the flowchart shown in FIG. 8 is used for steps S131 to S135.

First, in step S101, the surrounding environment information acquisition unit 101 acquires surrounding environment information around the own vehicle 10, using various sensors mounted to the own vehicle 10. As another acquisition method, surrounding environment information around the own vehicle 10 may be acquired from a traffic control center outside the own vehicle 10, or the like. The surrounding environment information is a set of information used for generating a route, such as the parking space 30, obstacle information around the own vehicle 10 including a passage width, and the parking goal position EP.

In step S102, the own-vehicle position estimation unit 102 estimates the present own-vehicle position, using various sensors mounted to the own vehicle 10 or the like, for example.

In step S103, the geometric route generation unit 103 generates the geometric route AL, using geometric formulation, as described above. The geometric route generation unit 103 also generates the connection point CP which is a terminal portion of the geometric route AL.

In step S104, the graph search route generation unit 104 generates the graph search route GL from the parking start position SP to the connection point CP, on the basis of the surrounding environment information around the own vehicle 10 and the connection point CP, using the graph search algorithm, as described above. In a case where the geometric route generation unit 103 cannot generate the geometric route AL, the graph search route generation unit 104 may generate the entire parking route from the parking start position SP to the parking goal position EP, as the graph search route GL, or may generate the graph search route GL again by changing a parameter to be used in the graph search algorithm.

Next, with reference to the flowchart in FIG. 7, a processing flow for graph search route generation will be described in detail.

In step S111, the geometric route generation unit 103 determines whether or not generation of the geometric route AL is possible. If it is determined that route generation of the geometric route AL is possible, the process proceeds to step S112. On the other hand, if it is determined that route generation of the geometric route AL is not possible, the process proceeds to step S113.

If it is determined in step S111 that route generation of the geometric route AL is possible, in step S112, the graph search route generation unit 104 sets the goal position, i.e., the terminal portion of the geometric route AL, as the connection point CP.

If it is determined in step S111 that route generation of the geometric route AL is not possible, in step S113, the graph search route generation unit 104 sets the goal position at the parking goal position EP, and the process proceeds to step S114.

In step S114, the graph search route generation unit 104 performs route generation processing by the graph search algorithm on the basis of the parking start position SP and the goal position. Through the route generation processing, a reference route, i.e., the graph search route GL, is calculated. Here, the reference route is a temporal profile represented by a vehicle speed, a steering angle, and a vehicle state (x, y, θ).

In step S115, whether or not generation of the reference route calculated in step S114 is actually possible is determined. If it is determined that generation of the reference route is possible, the process proceeds to step S116. On the other hand, if it is determined that generation of the reference route is not possible, the process proceeds to step S117.

If it is determined in step S115 that generation of the route calculated through the route generation processing in step S114 is possible, in step S116, the reference route, i.e., the graph search route GL, is outputted as route generation information to the route combination unit 105.

If it is determined in step S115 that generation of the reference route is not possible, in step S117, whether or not the route generation processing has been performed until reaching an upper limit number of times of processing, i.e., the maximum number of times of iteration, is determined. If it is determined that the upper limit number of times of processing is not exceeded, the process proceeds to step S118. On the other hand, if the upper limit number of times of processing is exceeded, the process is ended.

In step S118, a parameter to be used in the route generation processing is changed, and the process proceeds to step S114 to perform the route generation processing again, i.e., perform route generation again. Examples of parameters to be used in the route generation processing include the length of an edge, the curvature of an edge, and the upper limit number of times of processing (maximum number of times of iteration). A parameter to be changed may be other than the above parameters as long as the parameter is used in graph search route generation.

Here, returning to the flowchart shown in FIG. 6, in step S105, the route combination unit 105 outputs a parking route which is a route obtained by combining the geometric route AL from the parking goal position EP to the connection point CP generated by the geometric route generation unit 103 and the graph search route GL from the parking start position SP to the connection point CP generated by the graph search route generation unit 104. It is noted that, in a case where it has been determined in step S111 that route generation of the geometric route AL is not possible, if the graph search route generation unit 104 can generate a route from the parking start position SP to the parking goal position EP, the entire parking route from the parking start position SP to the parking goal position EP is outputted as the graph search route GL.

With reference to the flowchart in FIG. 8, a processing flow of route combination will be described in detail below.

In step S131, whether or not route generation of the geometric route AL is possible is determined. If it is determined that route generation of the geometric route AL is possible, the process proceeds to step S132. On the other hand, if it is determined that the route generation is not possible, the process proceeds to step S133.

In step S132, whether or not route generation of the graph search route GL is possible is determined. If it is determined that route generation of the graph search route GL is possible, the process proceeds to step S134. On the other hand, if it is determined that route generation of the graph search route GL is not possible, the process is ended.

If it is determined in step S131 that the route generation is not possible, in step S133, whether or not route generation of the graph search route GL is possible is determined. If it is determined that route generation of the graph search route GL is possible, the process proceeds to step S135. On the other hand, if it is determined that route generation of the graph search route GL is not possible, the process is ended.

In step S134, the route combination unit 105 outputs route generation information, i.e., a parking route, by combining the geometric route AL and the graph search route GL.

If it is determined in step S133 that route generation of the graph search route GL is possible, in step S135, the graph search route GL is outputted as route generation information, i.e., a parking route.

The processing flow, i.e., the route generation method, of operation of the route generation device in example 1 is as described above.

<Features and Effects of Route Generation Device in Example 1>

The route generation device 100 in example 1 has a feature that the parking route is a route obtained by combining the geometric route AL from the parking goal position EP to the connection point CP generated by the geometric route generation unit 103 and the graph search route GL from the parking start position SP to the connection point CP generated by the graph search route generation unit 104, a feature that, if the geometric route generation unit 103 cannot generate the geometric route AL from the parking goal position EP to the connection point CP, the graph search route generation unit 104 generates the entire parking route by performing graph search from the parking start position SP to the parking goal position EP, and a feature that, if the graph search route generation unit 104 cannot find the graph search route GL from the parking start position SP to the connection point CP, the graph search route generation unit 104 generates the graph search route GL again by changing a parameter to be used in the graph search algorithm.

The route generation device and the route generation method in example 1 of the first embodiment provide the following effects.

(1) During a complicated situation until entering the inside of the parking space or the vicinity of the parking space, a route is generated using the graph search algorithm, and until reaching the parking goal position from the inside of the parking space or the vicinity of the parking space, the geometric route is generated. Thus, the processing load can be reduced.

(2) By applying the graph search algorithm based on bidirectional search, the speed for obtaining a solution increases as compared to the conventional graph search in which search is performed only in one direction from an initial node to a goal node. That is, the processing load can be reduced.

(3) Even in a complicated situation with a narrow passage or in a case where the geometric route cannot be generated because connection from the parking goal position to the connection point cannot be made, it is possible to perform route generation of a parking route by applying the graph search algorithm.

(4) Even in a case where a graph search route from the parking start position to the connection point cannot be found by the graph search route generation unit, a route is generated again by changing a parameter to be used in the graph search algorithm, whereby loss of an opportunity where route generation can be performed can be avoided.

Example 2 of First Embodiment

<Route Generation Device in Example 2>

Hereinafter, the route generation device 100 in example 2 will be described. In example 2, a parking route is a route obtained by combining the geometric route AL from the parking goal position EP to the connection point CP generated by the geometric route generation unit 103 and the graph search route GL from the parking start position SP to the connection point CP generated by the graph search route generation unit 104.

The geometric route generation unit 103 calculates a plurality of connection points CP, i.e., terminal portions of a plurality of geometric routes AL, and imparts a cost (evaluation index) to each connection point CP. The graph search route generation unit 104 generates the graph search route GL, using at least one of the connection point CP and the parking goal position EP. In a case where there are a plurality of solutions as a parking route, the route combination unit 105 selects a parking route having a smaller cost.

More specifically, the geometric route generation unit 103 generates a connection point CP in the parking space 30 or in the vicinity of the parking space 30, and if there are a plurality of connection points CP, the geometric route generation unit 103 calculates inter-node costs, i.e., evaluation indices, of routes for the plurality of connection points CP. Then, the graph search route generation unit 104 generates the graph search route GL, using at least one of the plurality of connection points CP, and if there are a plurality of solutions as a parking route, the route combination unit 105 selects a parking route of which the sum of the evaluation indices is smallest.

The basic operation of the route generation device 100 in example 2 is as described above. Hereinafter, operation thereof will be described in more detail.

A processing flow, i.e., a route generation method, in example 2 is almost the same as the processing flow in example 1 shown in the flowcharts in FIG. 6 and FIG. 8, but each of the processing contents in step S103, step S104, and step S105 is partially different. Therefore, only processing in step S103, step S104, and step S105 will be described below.

Figure 9:
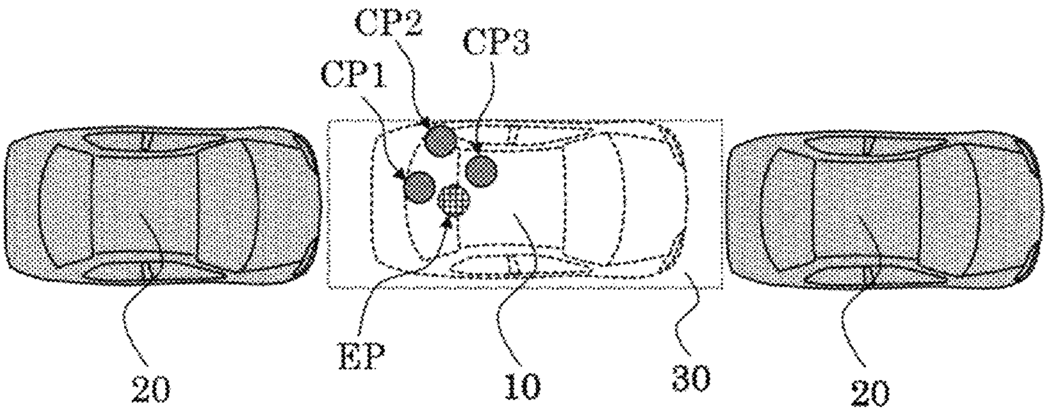
FIG. 9 is a schematic diagram illustrating operation of the route generation device in example 2 of the first embodiment.

In step S103, as shown in FIG. 9, the geometric route generation unit 103 generates a plurality of connection points CP, and imparts a cost (evaluation index) to each connection point CP. In the example in FIG. 9, three connection points, i.e., a connection point CP1, a connection point CP2, and a connection point CP3, are generated. Further, the geometric route generation unit 103 determines whether or not route generation of the geometric route AL is possible, and outputs the connection points CP and the costs (evaluation indices) corresponding to the connection points CP, to the route combination unit 105. The geometric route generation unit 103 outputs information about whether or not route generation of the geometric route AL is possible and the generated plurality of connection points CP, to the graph search route generation unit 104.

The plurality of connection points CP are respective final positions of a plurality of evaluation function minimizing routes described above, i.e., respective final positions of a plurality of evaluation function minimizing routes with the weight coefficient ω arbitrarily changed. The cost (evaluation index) is a value calculated from Expression (1) described above, for example.

That is, the geometric route generation unit 103 outputs the plurality of evaluation function minimizing routes, the costs, and information about whether or not route generation of the geometric route AL is possible, to the route combination unit 105, and outputs information about whether or not route generation of the geometric route AL is possible and respective final positions, i.e., terminal portions, of the plurality of evaluation function minimizing routes, as the connection points CP to the graph search route generation unit 104.

Figure 10:
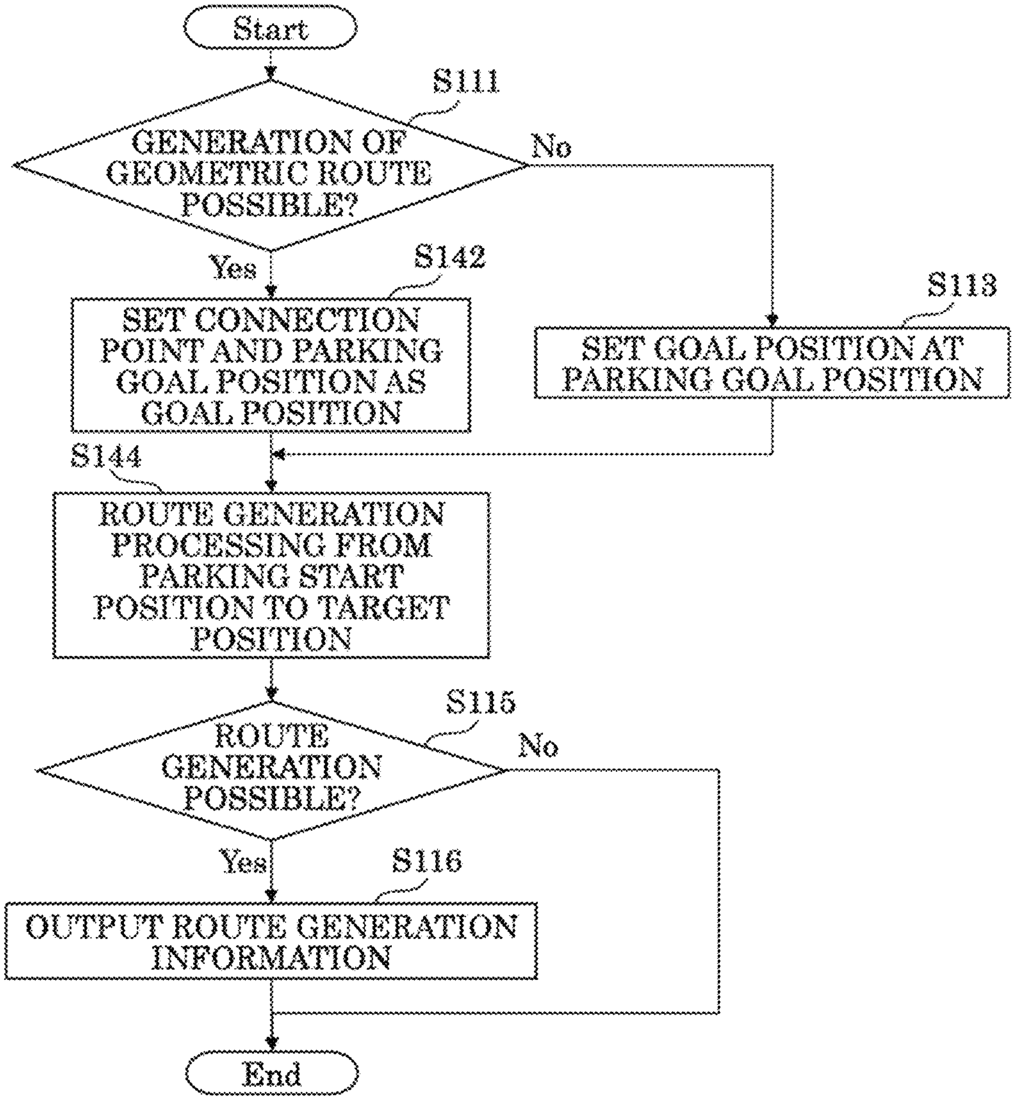
FIG. 10 is a flowchart illustrating a processing flow of a graph search route generation unit of the route generation device in example 2 of the first embodiment.

In step S104, the processing content of the flowchart (FIG. 7) of graph search route generation in example 1 is partially changed as shown in a flowchart of graph search route generation in example 2 shown in FIG. 10. Hereinafter, only parts different from the flowchart of graph search route generation in example 1 will be described.

In step S104 in the flowchart in FIG. 6, the graph search route generation unit 104 generates the graph search route GL, using at least one of the connection point CP and the parking goal position EP.

In step S142 in the flowchart in FIG. 10, the connection point CP and the parking goal position EP are set as a goal position (which may be a plurality of goal positions). In a case where there are a plurality of connection points CP, a plurality of goal positions are set.

In step S144, on the basis of the parking start position SP and the goal position, route generation processing for the graph search route GL by the graph search algorithm is performed. In a case where there are a plurality of goal positions, route generation processing corresponding to the plurality of positions is performed. In the above description, parallel processing is shown as an example, but another method may be applied as long as route generation processing can be performed for the plurality of positions.

In step S144, in performing generation processing for a route from the parking start position SP to the goal position, the graph search route generation unit 104 outputs the sum of costs (node costs) for respective calculated nodes, as route generation information to the route combination unit 105. As a method for calculating node costs, a calculation method of calculating the sum of node costs, i.e., the entire cost, as disclosed in Patent Document 1, may be applied, for example.

In step S115, whether or not generation of the route calculated in step S144 is possible is determined. If it is determined that the route generation is possible, the process proceeds to step S116. On the other hand, if it is determined that route generation is not possible, the process is ended.

In step S105 in the flowchart in FIG. 6, the processing content in step S134 shown in the flowchart of route combination in FIG. 8 is partially different. Hereinafter, only the processing in step S134 will be described.

In step S134, if there are a plurality of solutions for the geometric route AL and the graph search route GL, the route combination unit 105 selects a route having a smaller cost and outputs the selected route as route generation information.

The entire cost for route generation is denoted by L, a generation cost for the geometric route AL is denoted by $C_1$, a generation cost for the graph search route GL is denoted by $C_2$, and a route generation correction coefficient for correcting a cost ratio is denoted by α. Then, the entire cost L can be represented by the following Expression (2).

$$L = C_1 * (1 - \alpha) + C_2 * \alpha \tag{2}$$

The processing flow, i.e., the route generation method, of operation of the route generation device 100 in example 2 is as described above.

<Features and Effects of Route Generation Device and Route Generation Method in Example 2>

The route generation device and the route generation method in example 2 have a feature that the geometric route generation unit 103 calculates a plurality of connection points CP and imparts costs to the respective connection points CP, and the graph search route generation unit 104 generates the graph search route GL, using at least one of the connection point CP and the parking goal position EP, and if there are a plurality of solutions for a route, selects a route having a smaller cost.

The route generation device and the route generation method in example 2 provide the following effects.

(1) In a case where there are a plurality of solutions for a route, a route having a smaller cost is selected, whereby an efficient parking route can be generated.

Example 3 of First Embodiment

<Route Generation Device and Route Generation Method in Example 3>

Hereinafter, a route generation device and a route generation method in example 3 will be described. In example 3, in a case where a surrounding environment is changed between before and after route generation so that an obstacle 40 is detected on the route, and route generation is performed again, a graph search route GL to the connection point CP might be no longer found by the graph search route generation unit 104, and in this case, the geometric route generation unit 103 newly sets such a connection point CP (one or a plurality of connection points) that does not cause collision with the obstacle 40 on the geometric route AL, to generate a route again.

The basic operation of the route generation device 100 and the route generation method in example 3 is as described above. Hereinafter, operation of the route generation device 100 in example 3 will be described in more detail.

<Route Generation Method Using Route Generation Device in Example 3>

A processing flow, i.e., a route generation method, in example 3 is almost the same as the processing flows in examples 1 and 2 of the first embodiment shown in the flowcharts in FIG. 6, FIG. 8, and FIG. 10, but the processing content in step S103 is partially different. Hereinafter, only the processing in step S103 will be described.

Figure 11:
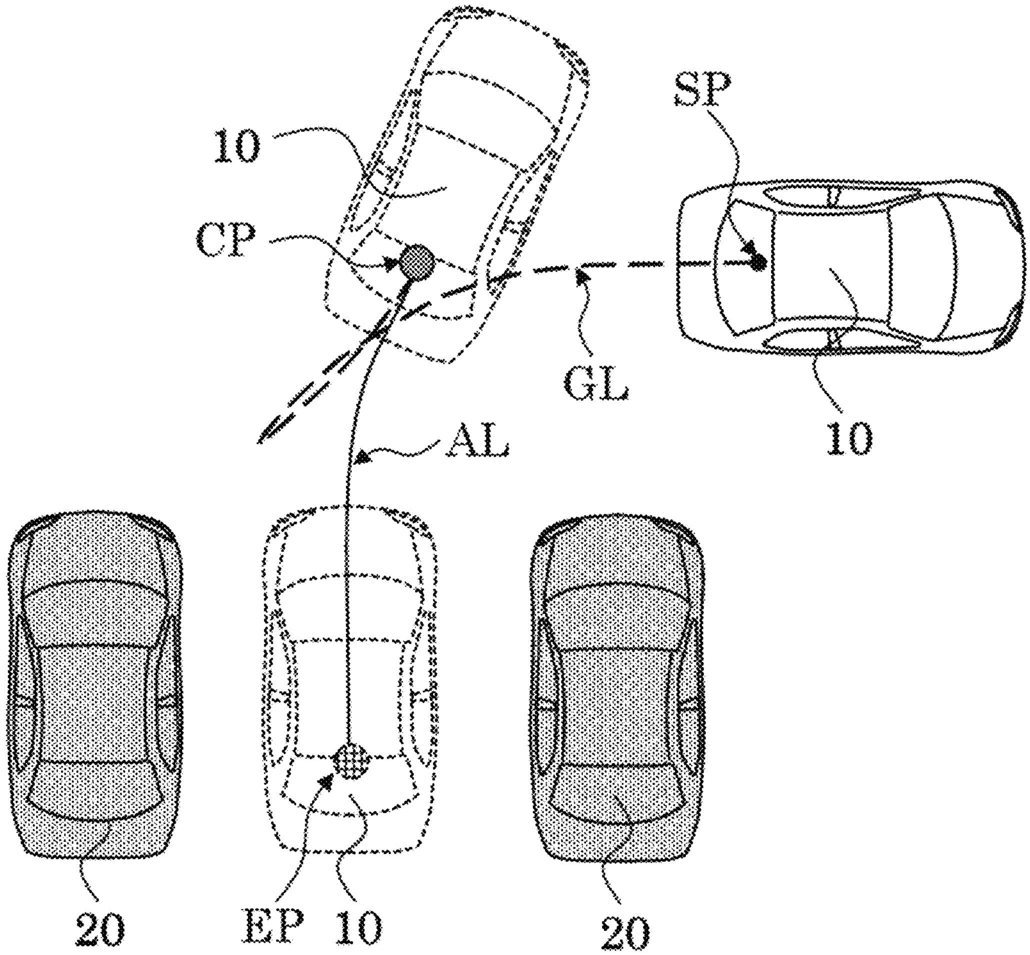
FIG. 11 is a schematic diagram illustrating operation of the route generation device in example 3 of the first embodiment.
Figure 12:
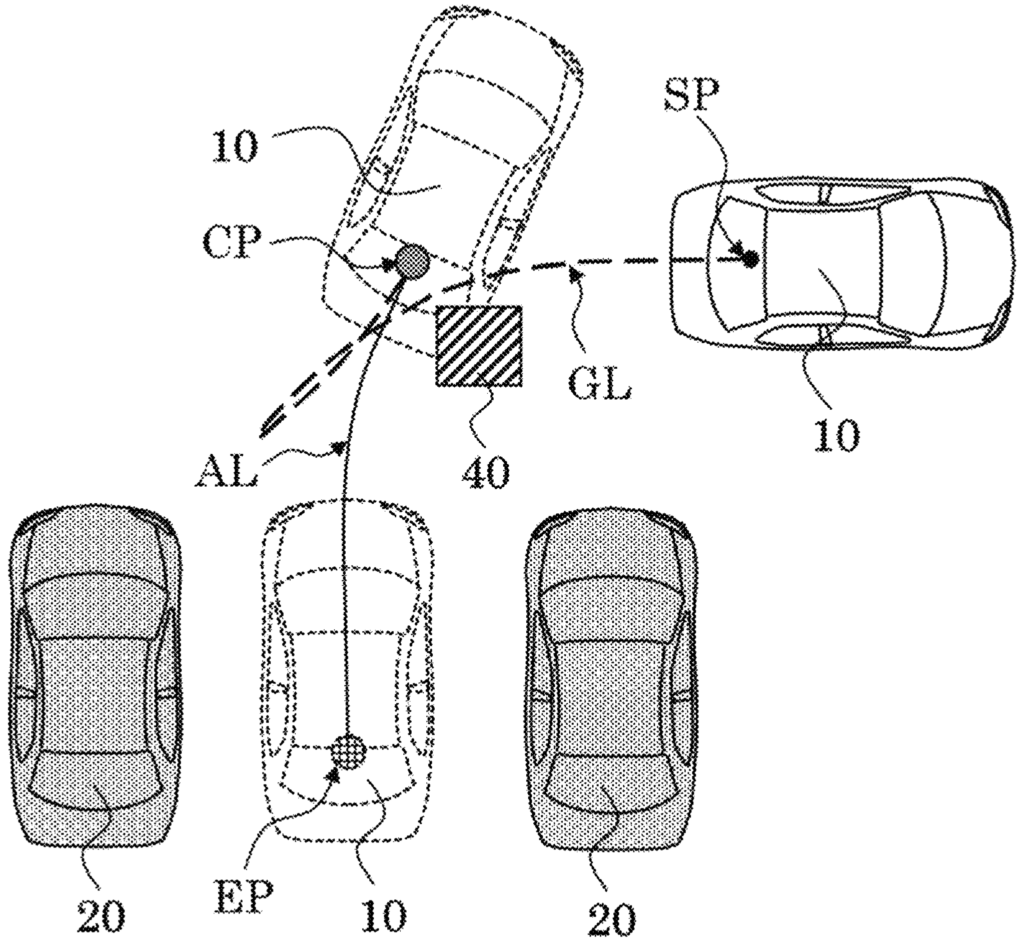
FIG. 12 is a schematic diagram illustrating operation of the route generation device in example 3 of the first embodiment.
Figure 13:
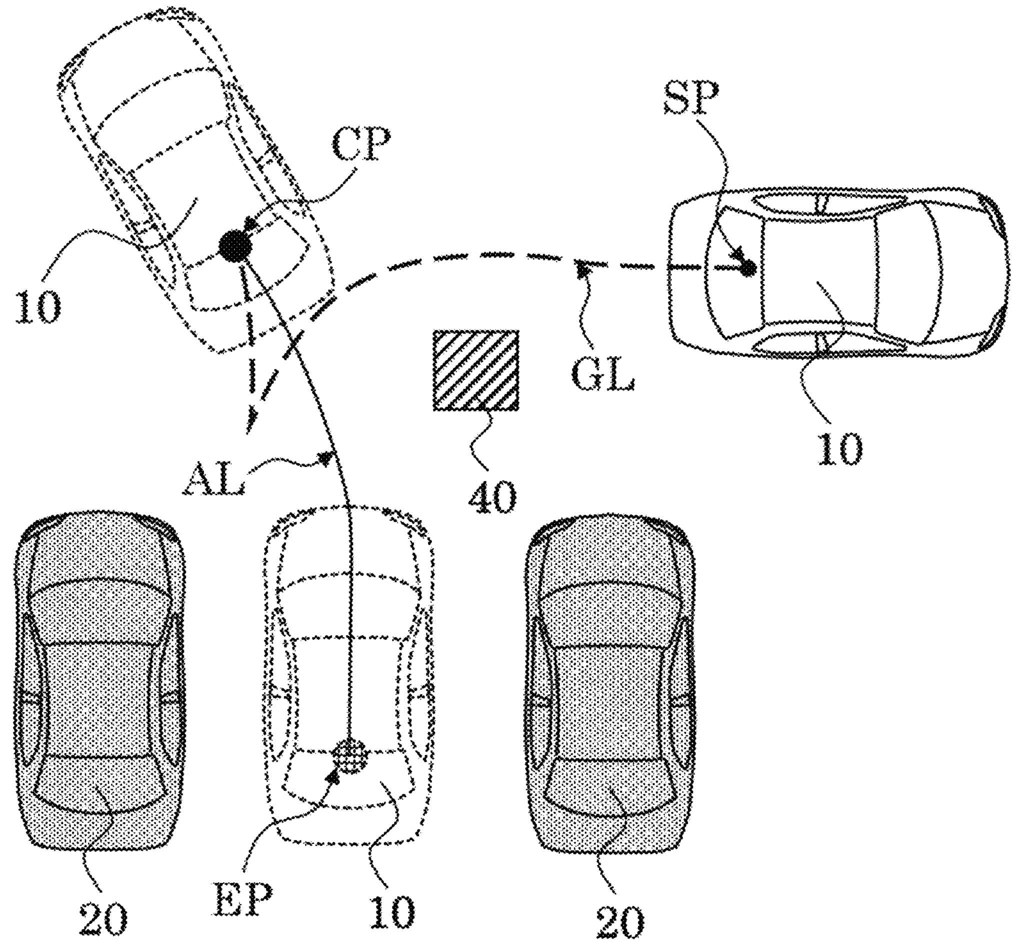
FIG. 13 is a schematic diagram illustrating operation of the route generation device in example 3 of the first embodiment.

In step S103 in the flowchart in FIG. 6, in a case where the graph search route generation unit 104 has found the graph search route GL from the parking start position SP to the connection point CP once (FIG. 11) but thereafter the route generation becomes impossible due to an event such as change in the surrounding environment because of the obstacle 40 (FIG. 12), the geometric route generation unit 103 generates again a new geometric route AL and a new connection point CP that will not cause contact with the obstacle 40, i.e., can avoid the obstacle 40 (FIG. 13). Here, one or a plurality of connection points CP are generated.

The route generation method in example 3 provides the following effects.

(1) Even in a case where route generation becomes impossible due to an event such as change in the surrounding environment because of an obstacle, the geometric route generation unit generates again such a geometric route and a connection point that do not cause contact with the obstacle, thus increasing the number of opportunities where route generation can be performed.

Effects of First Embodiment

Effects provided by the route generation device and the route generation method according to the first embodiment are described below.

(1) During a complicated situation until entering the inside of the parking space or the vicinity of the parking space, a route is generated using the graph search algorithm, and until reaching the parking goal position from the inside of the parking space or the vicinity of the parking space, the geometric route is generated. Thus, the processing load can be reduced.

(2) By applying the graph search algorithm based on bidirectional search, the speed for obtaining a solution increases as compared to the conventional graph search in which search is performed only in one direction from an initial node to a goal node. That is, the processing load can be reduced.

(3) Even in a complicated situation with a narrow passage or in a case where the geometric route cannot be generated because connection from the parking goal position to the connection point cannot be made, it is possible to perform route generation of a parking route by applying the graph search algorithm.

(4) Even in a case where a graph search route from the parking start position to the connection point cannot be found by the graph search route generation unit, a route is generated again by changing a parameter to be used in the graph search algorithm, whereby loss of an opportunity where route generation can be performed can be avoided.

(5) In a case where there are a plurality of solutions for a route, a route having a smaller cost is selected, whereby an efficient parking route can be generated.

(6) Even in a case where route generation becomes no longer possible due to an event such as change in the surrounding environment because of an obstacle, the geometric route generation unit generates again such a geometric route and a connection point that do not cause contact with an obstacle, thus increasing the number of opportunities where route generation can be performed.

Second Embodiment

<Configuration of Parking Assistance System According to Second Embodiment>

Figure 14:
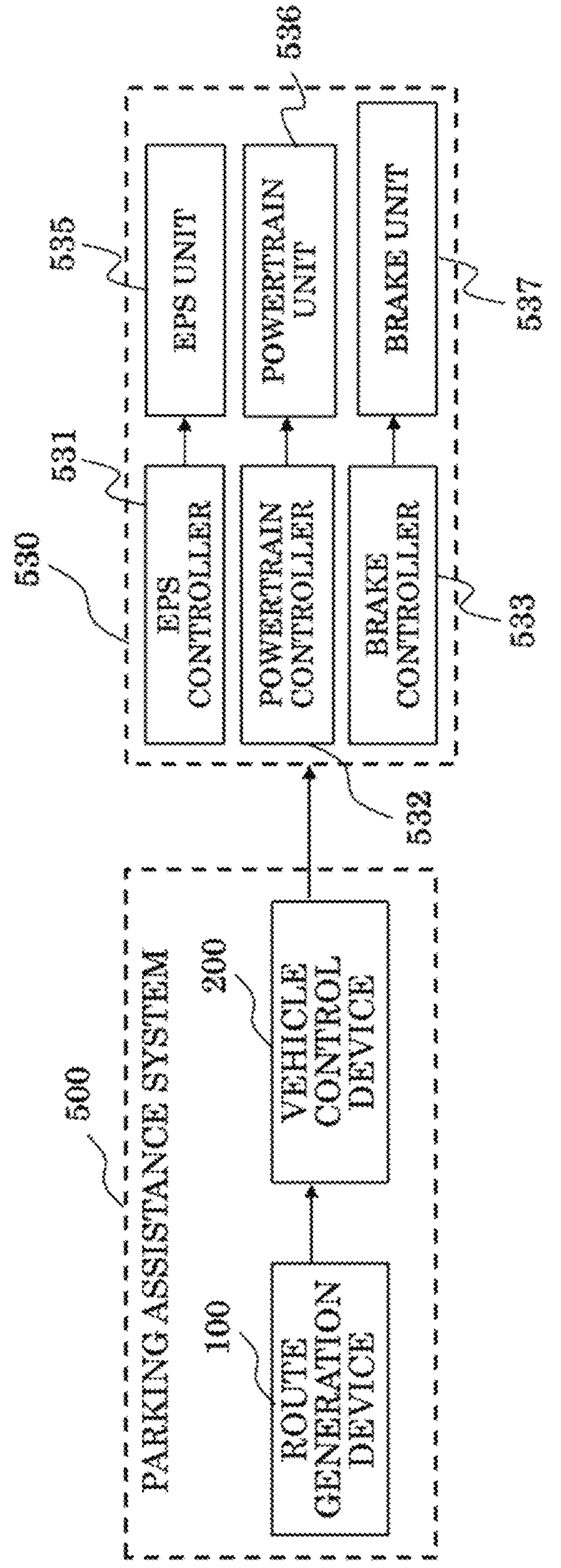
FIG. 14 is a block diagram of a route generation system according to the second embodiment of the present disclosure.

FIG. 14 is a block diagram showing a configuration of a parking assistance system 500 according to the second embodiment of the present disclosure. The parking assistance system 500 according to the second embodiment includes the route generation device 100 according to the first embodiment, and a vehicle control device 200.

The vehicle control device 200 performs vehicle control for parking a vehicle 10*a* to the parking goal position EP, on the basis of the route generation information outputted from the route combination unit 105 of the route generation device 100. The vehicle control device 200 calculates a target steering wheel operation amount in accordance with a temporal profile of the steering angle and the vehicle state generated by the route combination unit 105, and parks the vehicle 10*a* to the parking goal position EP. In addition, the vehicle control device 200 calculates a target vehicle speed in accordance with a temporal profile of the vehicle speed generated by the route combination unit 105 of the route generation device 100, and smoothly guides the vehicle 10*a* to the parking goal position EP.

For calculation of a target steering wheel operation amount and a target acceleration/deceleration in the vehicle control device 200, a known calculation method such as a calculation method using feedback control or a calculation method using model predictive control (MPC) can be applied.

When the surrounding environment has changed, the geometric route generation unit 103 and the graph search route generation unit 104 perform route generation again, and if route generation cannot be performed, the vehicle control device 200 determines to interrupt control.

In accordance with the interruption determination, the vehicle control device 200 stops the vehicle 10*a*, so that stoppage of the vehicle 10*a* continues for a certain period, for example. Further, in a case where the vehicle control device 200 determines that it is difficult to park the vehicle 10*a* to the parking goal position EP because of the influence of change in the surrounding environment or the like, the vehicle control device 200 stops parking control.

Figure 15:
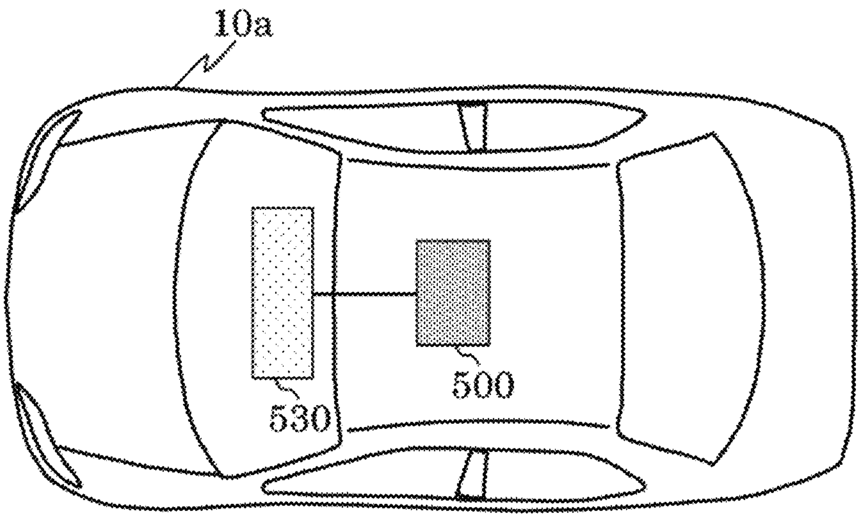
FIG. 15 is a schematic diagram of a vehicle provided with the route generation system according to the second embodiment.

FIG. 15 is a schematic diagram of the vehicle 10*a* provided with a parking assistance system 500 according to the second embodiment. The parking assistance system 500 and an actuator 530 are mounted to the vehicle 10*a*.

The actuator 530 includes an electronic power steering (EPS) unit 535, a powertrain unit 536, a brake unit 537, an EPS controller 531, a powertrain controller 532, and a brake controller 533. The actuator 530 controls an EPS, a brake, and an accelerator so that the vehicle 10*a* follows the target steering wheel operation amount and the target acceleration/deceleration.

Then, the vehicle control device 200 processes information inputted from various connected sensors (not shown) in accordance with a program stored in a ROM, transmits a target control amount to the EPS controller 531, transmits a target driving force to the powertrain controller 532, and transmits a target braking force to the brake controller 533.

The EPS controller 531 controls the EPS unit 535 on the basis of the target control amount transmitted from the vehicle control device 200. By the EPS controller 531, for example, the steering angle can be controlled so that the vehicle 10*a* travels along a target trajectory.

The powertrain controller 532 controls the powertrain unit 536 so as to achieve the target driving force transmitted from the vehicle control device 200.

In the description of the second embodiment, the vehicle using only an engine as a driving force source has been shown as an example. However, a vehicle using only an electric motor as a driving force source, a vehicle using both of an engine and an electric motor as driving force sources, or the like is also applicable.

The brake controller 533 controls the brake unit 537 so as to achieve the target braking force transmitted from the vehicle control device 200.

The outline of the configuration and operation of the parking assistance system 500 including the route generation device 100 and the vehicle control device 200 is as described above.

Effects of Second Embodiment

As described above, the parking assistance system according to the second embodiment performs generation of a parking route, using the route generation device according to the first embodiment, thus providing an effect that it is possible to appropriately adapt to the surrounding environment and achieve efficient parking control for reducing the processing load.

In the above description, the functions of the respective components of the route generation device 100 according to the first embodiment and the parking assistance system 500 according to the second embodiment are implemented by one of hardware and software, etc. However, without limitation thereto, some components of the route generation device 100 and the parking assistance system 500 may be implemented by dedicated hardware, and the other components may be implemented by software, etc.

Figure 16:
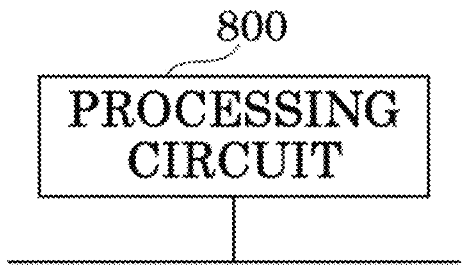
FIG. 16 shows a hardware configuration for implementing the route generation device according to the first embodiment and a parking assistance system according to the second embodiment.
Figure 17:
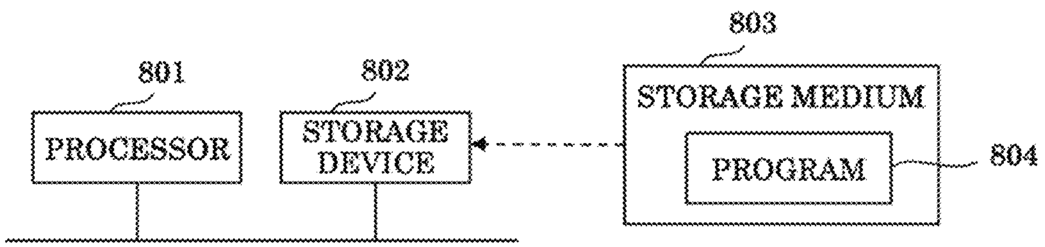
FIG. 17 shows a hardware configuration for implementing the route generation device according to the first embodiment and the parking assistance system according to the second embodiment.

For example, as shown in FIG. 16 and FIG. 17, for some components, the functions thereof may be implemented by a processing circuit 800 as dedicated hardware, and for the other components, the processing circuit 800 as a processor 801 may read and execute a program stored in a storage device 802 for causing a computer or the like to execute the route generation method according to the first embodiment, thereby implementing the functions of the other components.

Further, as shown in FIG. 17, setting data to be used in the function units and the like of the route generation device 100 and the parking assistance system 500 may be installed as a part of software to the storage device 802 from a storage medium 803 storing a program 804 for causing a computer or the like to execute the route generation method according to the first embodiment.

As described above, the route generation device 100 according to the first embodiment and the parking assistance system 500 according to the second embodiment can implement the above-described functions by hardware and software, etc., or a combination thereof.

Summary of Modes of Present Disclosure

Hereinafter, modes of the present disclosure are summarized as additional notes.

(Additional Note 1)

A route generation device comprising:

a surrounding environment information acquisition unit which acquires information about a surrounding environment around an own vehicle;

an own-vehicle position estimation unit which estimates an own-vehicle position;

a geometric route generation unit which generates a geometric route, using an expression representing a geometric shape of a route;

a graph search route generation unit which generates a graph search route, using a graph search algorithm for searching for a route using a plurality of nodes and a plurality of edges connecting the nodes; and a route combination unit which generates a parking route from a parking start position to a parking goal position in a parking space by combining the geometric route and the graph search route.

(Additional Note 2)

The route generation device according to additional note 1, wherein the parking route is a route obtained by combining the geometric route which is a route from the parking goal position to a connection point, generated by the geometric route generation unit, and the graph search route which is a route from the parking start position to the connection point, generated by the graph search route generation unit.

(Additional Note 3)

The route generation device according to additional note 2, wherein in generating the geometric route, the geometric route generation unit generates a terminal portion of the geometric route as the connection point, and in a case where there are a plurality of the connection points, the geometric route generation unit calculates evaluation indices of respective routes for the plurality of connection points, the graph search route generation unit generates the graph search route, using at least one of the plurality of connection points, and in a case where there are a plurality of solutions for the parking route, the route combination unit selects the parking route of which a sum of the evaluation indices is smallest.

(Additional Note 4)

The route generation device according to additional note 1, wherein in a case where the geometric route generation unit is unable to generate the geometric route, the graph search route generation unit generates the parking route from the parking start position to the parking goal position, as the graph search route.

(Additional Note 5)

The route generation device according to additional note 2 or 3, wherein the graph search route generation unit uses the graph search algorithm configured to generate the graph search route by connecting an initial tree composed of the plurality of nodes and the plurality of edges for heading toward a goal node corresponding to the connection point starting from an initial node corresponding to the parking start position, and a goal tree composed of the plurality of nodes and the plurality of edges for heading toward the initial node starting from the goal node.

(Additional Note 6)

The route generation device according to additional note 5, wherein in a case where the graph search route generation unit is unable to generate the graph search route, the graph search route generation unit generates the graph search route again by changing a parameter to be used in the graph search algorithm.

(Additional Note 7)

The route generation device according to additional note 6, wherein the parameter is at least one of a length of the edge, a curvature of the edge, and a maximum number of times of iteration.

(Additional Note 8)

The route generation device according to any one of additional notes 2, 3, and 5 to 7, wherein in a case where, after generation processing for the graph search route, the surrounding environment has changed, the surrounding environment information acquisition unit acquires information about an obstacle located on the graph search route, and the graph search route generation unit is unable to generate the graph search route, the geometric route generation unit generates again the geometric route and the connection point for avoiding the obstacle.

(Additional Note 9)

A parking assistance system comprising:

the route generation device according to any one of additional notes 1 to 8; and a vehicle control device which parks the own vehicle on the basis of the parking route generated by the route generation device.

(Additional Note 10)

The parking assistance system according to additional note 9, wherein in a case where, when the surrounding environment has changed, the parking route is unable to be generated even by the geometric route generation unit and the graph search route generation unit both generating routes again, the vehicle control device determines to interrupt vehicle control of the own vehicle.

(Additional Note 11)

The parking assistance system according to additional note 10, wherein in accordance with the interruption determination, the vehicle control device stops the own vehicle and stops parking control.

(Additional Note 12)

A route generation method which is a vehicle control method for executing the following steps by a processing circuit, the route generation method comprising the steps of:

generating, using an expression representing a geometric shape of a route, a geometric route, and generating a terminal portion of the geometric route as a connection point;

generating a graph search route on the basis of a graph search algorithm using nodes and an edge connecting the nodes; and generating a parking route from a parking start position to a parking goal position by combining the geometric route and the graph search route via the connection point.

(Additional Note 13)

The route generation method according to additional note 12, wherein the graph search algorithm is configured to generate the graph search route by connecting an initial tree composed of a plurality of the nodes and a plurality of the edges for heading toward a goal node corresponding to the connection point starting from an initial node corresponding to the parking start position, and a goal tree composed of a plurality of the nodes and a plurality of the edges for heading toward the initial node starting from the goal node.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

10 own vehicle
10*a* vehicle
20 adjacent vehicle
30 parking space
40 obstacle
100 route generation device
101 surrounding environment information acquisition unit
102 own-vehicle position estimation unit
103 geometric route generation unit
104 graph search route generation unit
105 route combination unit
200 vehicle control device
500 parking assistance system
530 actuator
531 EPS controller
532 powertrain controller
533 brake controller
535 EPS unit
536 powertrain unit
537 brake unit
800 processing circuit
801 processor
802 storage device
803 storage medium
804 program
AL geometric route
CP, CP1, CP2, CP3 connection point
EP parking goal position
ET goal tree
GL graph search route
SP parking start position
ST initial tree

What is claimed is:

1. A route generation device comprising at least one processor configured to implement:

a surrounding environment information acquisition circuitry which acquires information about a surrounding environment around an own vehicle;

an own-vehicle position estimator which estimates an own-vehicle position;

a geometric route generator which generates a geometric route from a parking goal position to a connection point, using an expression representing a geometric shape of a route;

a graph search route generator which generates a graph search route from a parking start position to the connection point, using a graph search algorithm for searching for a route using a plurality of nodes and a plurality of edges connecting the nodes; and a route combination circuitry which generates a parking route from the parking start position to the parking goal position in a parking space by combining the geometric route and the graph search route, wherein:

in generating the geometric route, the geometric route generator generates a terminal portion of the geometric route as the connection point, and in a case where there are a plurality of the connection points, the geometric route generator calculates evaluation indices of respective routes for the plurality of connection points, the graph search route generator generates the graph search route, using at least one of the plurality of connection points, and in a case where there are a plurality of solutions for the parking route, the route combination circuitry selects the parking route of which a sum of the evaluation indices is smallest.

2. The route generation device according to claim 1, wherein:

the graph search route generator uses the graph search algorithm configured to generate the graph search route by connecting an initial tree composed of the plurality of nodes and the plurality of edges for heading toward a goal node corresponding to the connection point starting from an initial node corresponding to the parking start position, and a goal tree composed of the plurality of nodes and the plurality of edges for heading toward the initial node starting from the goal node.

3. The route generation device according to claim 2, wherein:

in a case where the graph search route generator is unable to generate the graph search route, the graph search route generator generates the graph search route again by changing a parameter to be used in the graph search algorithm.

4. The route generation device according to claim 3, wherein:

the parameter is at least one of a length of the edge, a curvature of the edge, and a maximum number of times of iteration.

5. The route generation device according to claim 1, wherein:

in a case where, after generation processing for the graph search route, the surrounding environment has changed, the surrounding environment information acquisition circuitry acquires information about an obstacle located on the graph search route, and the graph search route generator is unable to generate the graph search route, the geometric route generator generates again the geometric route and the connection point for avoiding the obstacle.

6. A parking assistance system comprising:

the route generation device according to claim 1; and a vehicle control device which parks the own vehicle on the basis of the parking route generated by the route generation device.

7. The parking assistance system according to claim 6, wherein:

in a case where, when the surrounding environment has changed, the parking route is unable to be generated even by the geometric route generator and the graph search route generator both generating routes again, the vehicle control device determines to interrupt vehicle control of the own vehicle.

8. The parking assistance system according to claim 7, wherein:

in accordance with the interruption determination, the vehicle control device stops the own vehicle and stops parking control.

9. The route generation device according to claim 1, wherein:

the geometric route is formed by a combination of at least one of a straight line, a clothoid curve, an arc curve, or a polynomial curve.

10. The route generation device according to claim 1, wherein:

the geometric route generator generates the geometric route as an evaluation function minimizing route that minimizes an evaluation function.

11. The route generation device according to claim 10, wherein:

the evaluation function is based on a curvature of the geometric route and a weight coefficient for each turn-about.

12. The route generation device according to claim 1, wherein:

the graph search route generator uses a bidirectional graph search algorithm by connecting an initial tree composed of the plurality of the nodes and the plurality of the edges for heading toward the connection point from the parking start position, and a goal tree composed of a plurality of the nodes and a plurality of the edges for heading toward the parking start position from the connection point.

13. A route generation method, comprising:

generating, using an expression representing a geometric shape of a route, a geometric route from a parking goal position to a connection point, and generating a terminal portion of the geometric route as the connection point, and in a case where there are a plurality of the connection points, calculating evaluation indices of respective routes for the plurality of connection points;

generating a graph search route from a parking start position to the connection point on the basis of a graph search algorithm using nodes and an edge connecting the nodes using at least one of the plurality of connection points; and generating a parking route from the parking start position to the parking goal position by combining the geometric route and the graph search route via the connection point, and in a case where there are a plurality of solutions for the parking route, selecting the parking route of which a sum of the evaluation indices is smallest.

14. The route generation method according to claim 13, wherein:

the graph search algorithm is configured to generate the graph search route by connecting an initial tree composed of a plurality of the nodes and a plurality of the edges for heading toward a goal node corresponding to the connection point starting from an initial node corresponding to the parking start position, and a goal tree composed of a plurality of the nodes and a plurality of the edges for heading toward the initial node starting from the goal node.

15. A route generation device comprising at least one processor configured to implement:

a surrounding environment information acquisition circuitry which acquires information about a surrounding environment around an own vehicle;

an own-vehicle position estimator which estimates an own-vehicle position;

a geometric route generator which generates a geometric route, using an expression representing a geometric shape of a route;

a graph search route generator which generates a graph search route, using a graph search algorithm for searching for a route using a plurality of nodes and a plurality of edges connecting the nodes; and a route combination circuitry which generates a parking route from a parking start position to a parking goal position in a parking space by combining the geometric route and the graph search route, wherein in a case where the geometric route generator is unable to generate the geometric route, the graph search route generator generates the parking route from the parking start position to the parking goal position, as the graph search route.

* * * * *